US006285756B1

United States Patent
Fan

(10) Patent No.: US 6,285,756 B1
(45) Date of Patent: Sep. 4, 2001

(54) MULTIFUNCTIONAL DEVICE FREE OF HOLDING TELEPHONE

(76) Inventor: Eagle Fan, 30 Luchang, Luchang Li, Chupei City, Hsinchu (TW)

( * ) Notice: Subject to any disclaimer, the term of this patent is extended or adjusted under 35 U.S.C. 154(b) by 0 days.

(21) Appl. No.: 09/375,512

(22) Filed: Aug. 17, 1999

(51) Int. Cl.⁷ .................................................. H04M 1/00
(52) U.S. Cl. ............................................................ 379/430
(58) Field of Search ..................................... 379/430, 446, 379/454, 455; 381/380, 381, 376

(56) References Cited

U.S. PATENT DOCUMENTS

| | | | |
|---|---|---|---|
| 4,893,344 | * 1/1990 | Tragardh et al. | 379/430 |
| 5,606,607 | * 2/1997 | Yamaguchi et al. | 379/430 |
| 5,943,627 | * 8/1999 | Kim et al. | 379/430 |
| 6,097,809 | * 8/2000 | Lucey et al. | 379/430 |

* cited by examiner

Primary Examiner—Jack Chiang
(74) Attorney, Agent, or Firm—Smith, Gambrell & Russell, LLP

(57) ABSTRACT

A multifunction device free of holding telephone comprises a holder, a clip and a connecting seat, wherein the holder and clip are jointed through a catching structure and can be optionally disassembled or assembled, the clip is provided with a loud speaking structure and a microphone, the loud speaking structure can rotate for 180° and be directly caught in the user's ear, a hose is connected to the microphone for optionally adjusting the position of microphone so as to fix the microphone in a fixed position, the device free of holding telephone is hanged on the edge of the user's ear through winding a power source wire in an annular shape so as to hang the device free of holding telephone on the user's ear; a battery can be disposed in the holder, a connecting seat is provided at the bottom of the holder and can be connected to other connected element with optional function such as an ordinary pen or laser pen or flashlight, a hose can be directly fixed onto the connecting seat so as to support and dispose the device free of holding telephone on a plane in favor of the user's use for documentary operations so as to achieve the purpose of being free of holding telephone and a number of replaceable functions.

9 Claims, 5 Drawing Sheets

MULTIFUNCTIONAL DEVICE FREE OF HOLDING TELEPHONE

BACKGROUND OF THE INVENTION

The present invention is related to a multifunction device free of holding telephone and particularly to a structure which can be directly caught on the back edge of the user's ear to receive and transmit free of holding telephone during march and meantime to connect structures of other functions.

The conventional device free of holding telephone is chiefly used during driving a car and normally provided with a holder, a loud speaking device, an earphone and a microphone, wherein the holder holds a mobile telephone to be fixed in the car, the loud speaking device installed outside the car amplifies the sound source of mobile telephone or the earphone substitutes the loud speaking device, and the microphone sounds to transmit the sound to another end of telephone. Such a device can achieve the purpose of being free of holding telephone but its structure is rather complex and occupies a large space so it leaves much to be desired.

SUMMARY OF THE INVENTION

The primary object of the present invention is to offer a multifunction device free of holding telephone wherein the loud speaking structure can be directly caught in the user's ear, a hose is connected to a microphone in favor of adjusting the position of using the microphone, and the whole device free of holding telephone is directly caught on the back edge of the user's ear through winding the power source wire so as to achieve the purpose of proceeding with receiving and transmitting free of holding telephone at any time.

The secondary object of the present invention is to disclose a multifunction device free of holding telephone which can be a single member and can be connected to a connected article with other functions so as to achieve the purpose of pluralized functions.

Another object of the present invention is to show a multifunction device free of holding telephone. If the device is a single member, a hose can be provided on the bottom of the holder so as to support the device free of holding telephone on a plane for use.

Still another object of the present invention is to indicate a multifunction device free of holding telephone wherein the loud speaking structure can rotate for about 180° on the device free of holding telephone so that in case of disposing it on a table, the direction of loud speaking structure can be adjusted in favor of the user's rece clearly.

The objects, characteristics and functions of the present invention can be best described in detail in conjunction with the following embodiment and accompanying drawings.

DETAILED DESCRIPTION

Figure 1:
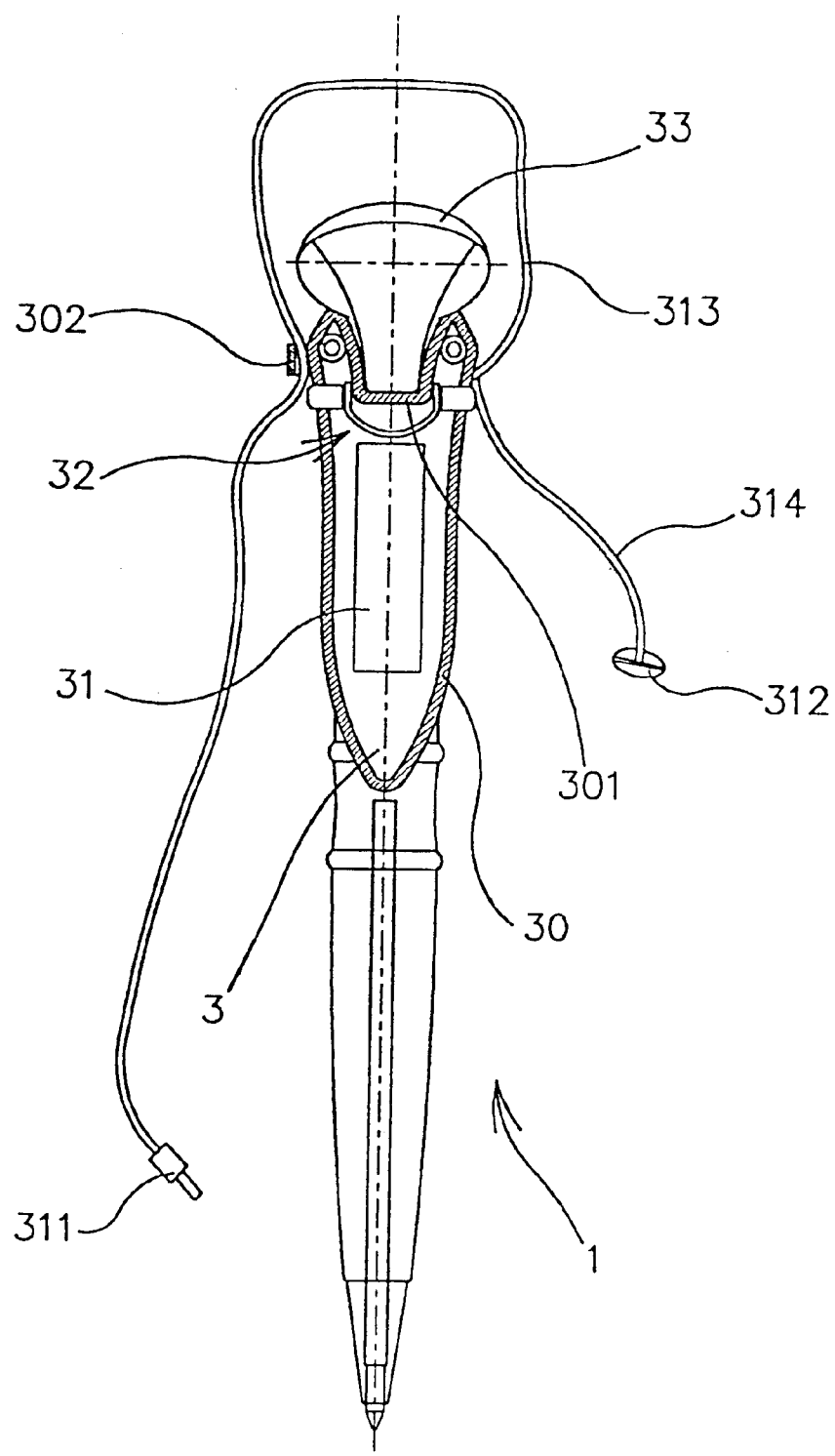
FIG. 1 is a section view of a structure assembling the device free of holding telephone with a pen in general according to the present invention.
Figure 2:
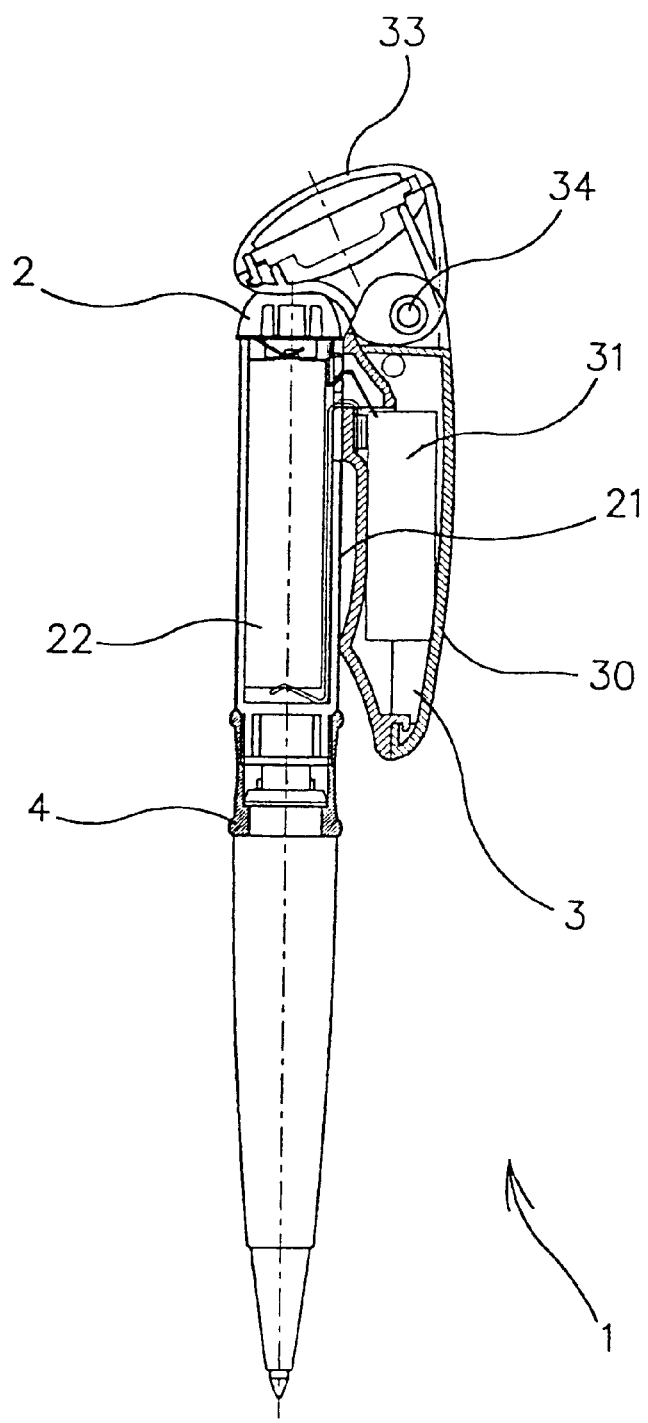
FIG. 2 is a section view of a structure of FIG. 1 in another direction.
Figure 4:
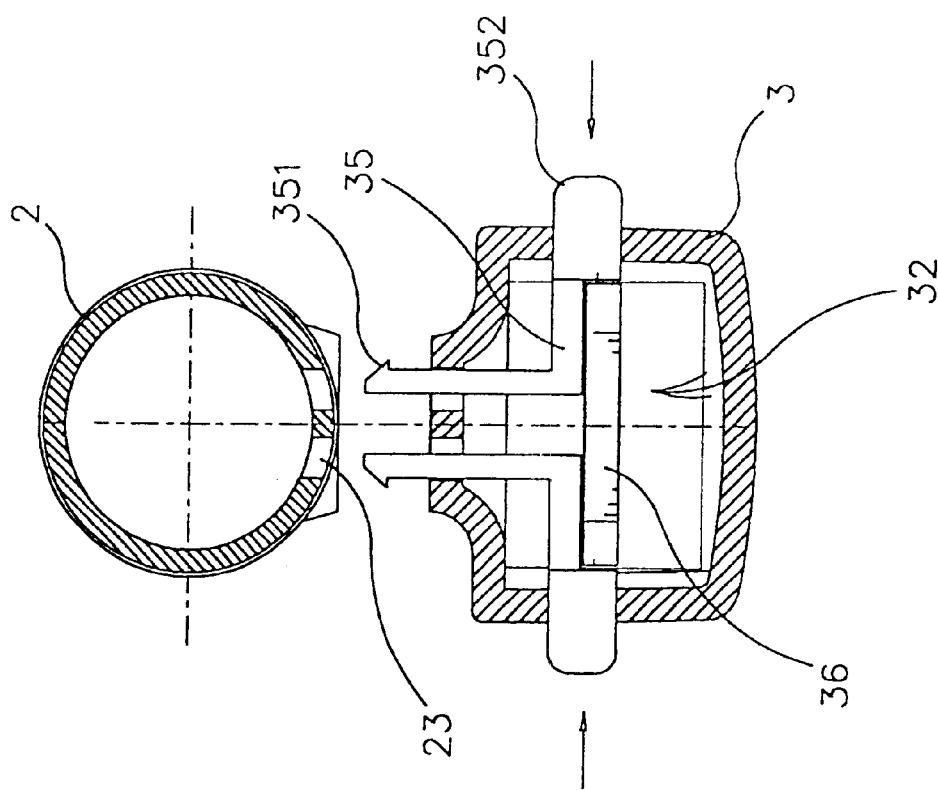
FIG. 4 is an optional view of a catching structure according to the present invention.
Figure 4:
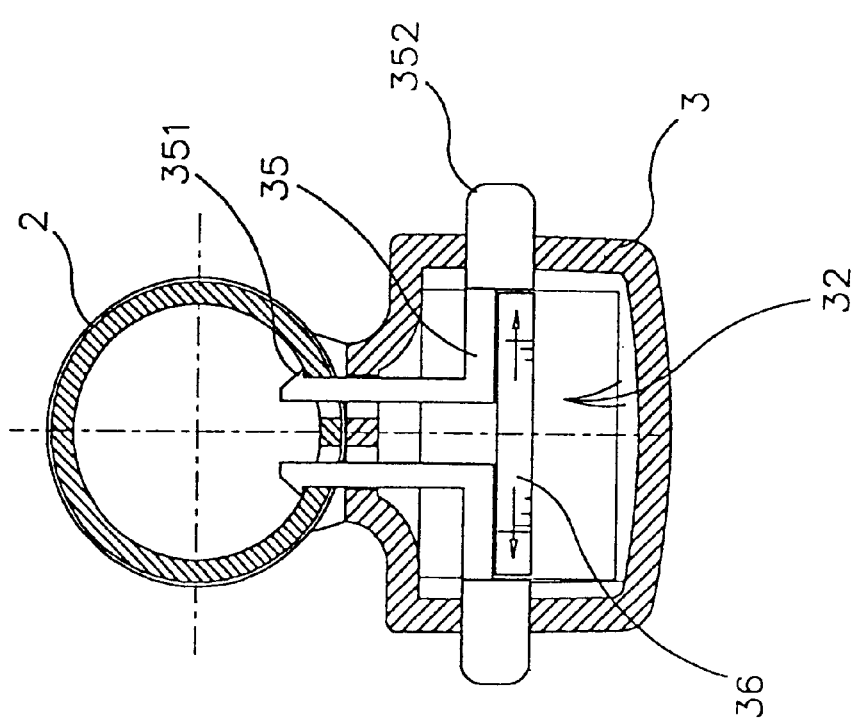

As shown in FIG. 1 and 2, the device free of holding telephone 1 consists of a holder 2, a clip 3 and a connecting seat 4, wherein the holder 2 is a cylinder of which the interior is a space for battery seat, one side edge is provided with an open portion 21 in favor of disposing a battery 22 therein, a suitable position on the outer edge is provided with two holes 23 (as shown in FIG. 4); the clip 3 is similar to a pen clip and consists of two housings 30 corresponding to each other, wherein a PC board 31 and a catching structure 32 are provided, a groove 301 is formed at the top thereof for disposing a loud speaking structure 33 of which the top end is in the form of an earphone for disposing in the user's ear, and the bottom is provided with a lateral revolving shaft 34 of which the two ends are caught up to the two sides of the groove 301 on the housing 30 so as to fix the loud speaking structure 33 and let the loud speaking structure 33 rotate along the groove 301 for 180° in respect of the revolving shaft 34 as a fulcrum; the PC board 31 of clip 3 is provided with a power source wire extended to the outer side of housing 30 where this wire is divided into two branches connected respectively to a power source plug 311 and a microphone 312, wherein the plug power source wire 313 is extended from one side of the housing 30 to outside, the outer edge of housing 30 at another end of the outgoing end of the power source wire 313 is provided with a catching portion 302 which protrudes outside the housing 30 to be an L-shaped block, the power source wire 313 winds through another end of the housing 30 and catches on the catching portion 302 and winds above the clip 3 to form a loop for the user to dispose it on the back edge of his ear; the microphone 312 is connected to a hose 314 ramified from the power source wire 313, the hose 313 is a flexible tube which can be adjusted and fixed at a required angle in favor of adjusting the microphone 312 to be fixed in a position on the outer side of the user's face so that he can clearly receive and transmit during march.

Figures 3A, 3B:
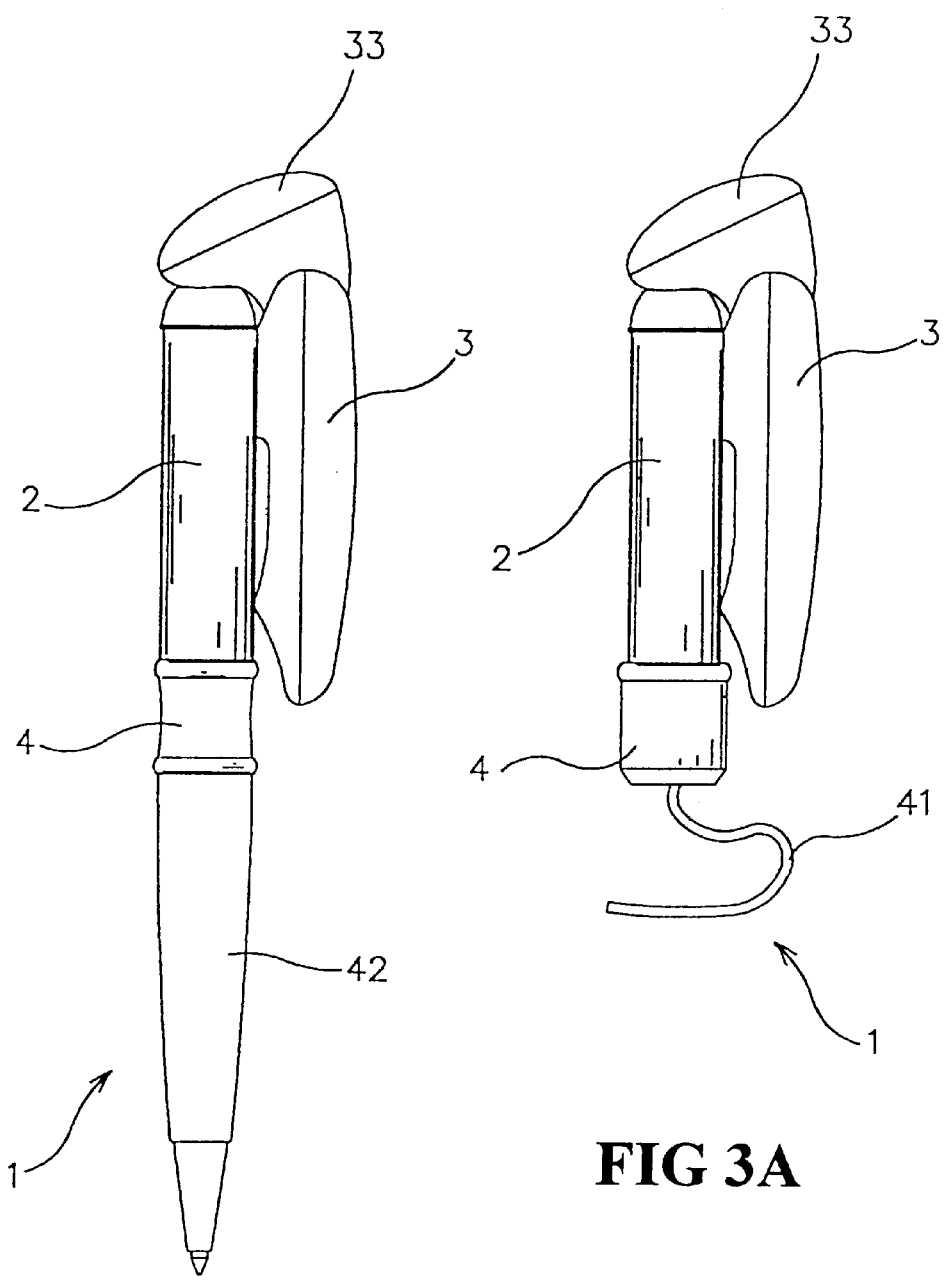
FIG. 3A is an example of the present invention.
FIG. 3B is another example of the present invention.

As shown in FIG. 3A, the device free of holding telephone 1 is a single member of which the bottom is provided with the connecting seat 4, and as shown in FIG. 2, the connecting seat 4 is connected to the holder 2 through threadable receiving and tight coupling, but this is only an example and never be limited thereto, so any well-known skill used to joint and fix the holder 2 and the connecting seat 4 is all right; a hose 41 is a small flexible tube fixed at another end of the connecting seat 4 for adjusting in a state of optional turning and fixing, and through adjusting the hose 41, the device free of holding telephone 1 is supported to stand on a plane such as on a table in favor of the user to dispose the device free of holding telephone 1 on a table for use, and when the device free of holding telephone 1 is disposed to stand on a table, the user still can proceed with documentary work on the table such as writing something and operating computer, and through turning and adjusting the direction of loud speaking structure 33 to correspond with the angle and direction of the user's position, it is in favor of the user clearly receiving and transmitting so as to achieve the purpose of being free of holding telephone.

As shown in FIG. 3B, the device free of holding telephone 1 can be connected to a article with other function through a connecting seat 4, this article may be a pen or flashlight. The article as shown in the drawing is a pen 42 which may be an ordinary pen or laser pen and can be caught on the user's clothing through a clip 3 on the device free of holding telephone 1 so that he can bring a pen with him for use and the device free of holding telephone 1 has the function of being free of holding telephone and other functions simultaneously.

As shown in FIG. 4, a catching structure 32 in the clip 3 consists of a set of corresponding hook bodies 35 and a spring leaf 36, the hook body 35 is approximately L-shaped and has two ends respectively formed as a hook 351 and a salient 352 and extended to the outside of housing 30 of the clip 3, the spring leaf 36 is disposed between these two hook bodies 35, the distance between these two hooks 351 can be shortened through pressing the outer salient 352 of the housing 30 so as to let the hook 351 catch in or disengage from hole 23 on the holder 2; when to directly catch the device free of holding telephone 1 in the user's ear, the clip 3 can be removed from the holder 2 so as to decrease the weight of hanging on the ear edge in favor of use. However, the catching structure 32 consists of a hook body 35 and a spring leaf 36; this is only an example which cannot be confined, any well-known skill to joint the holder 2 with the clip 3 or disengage therefrom is all right.

Figure 5:
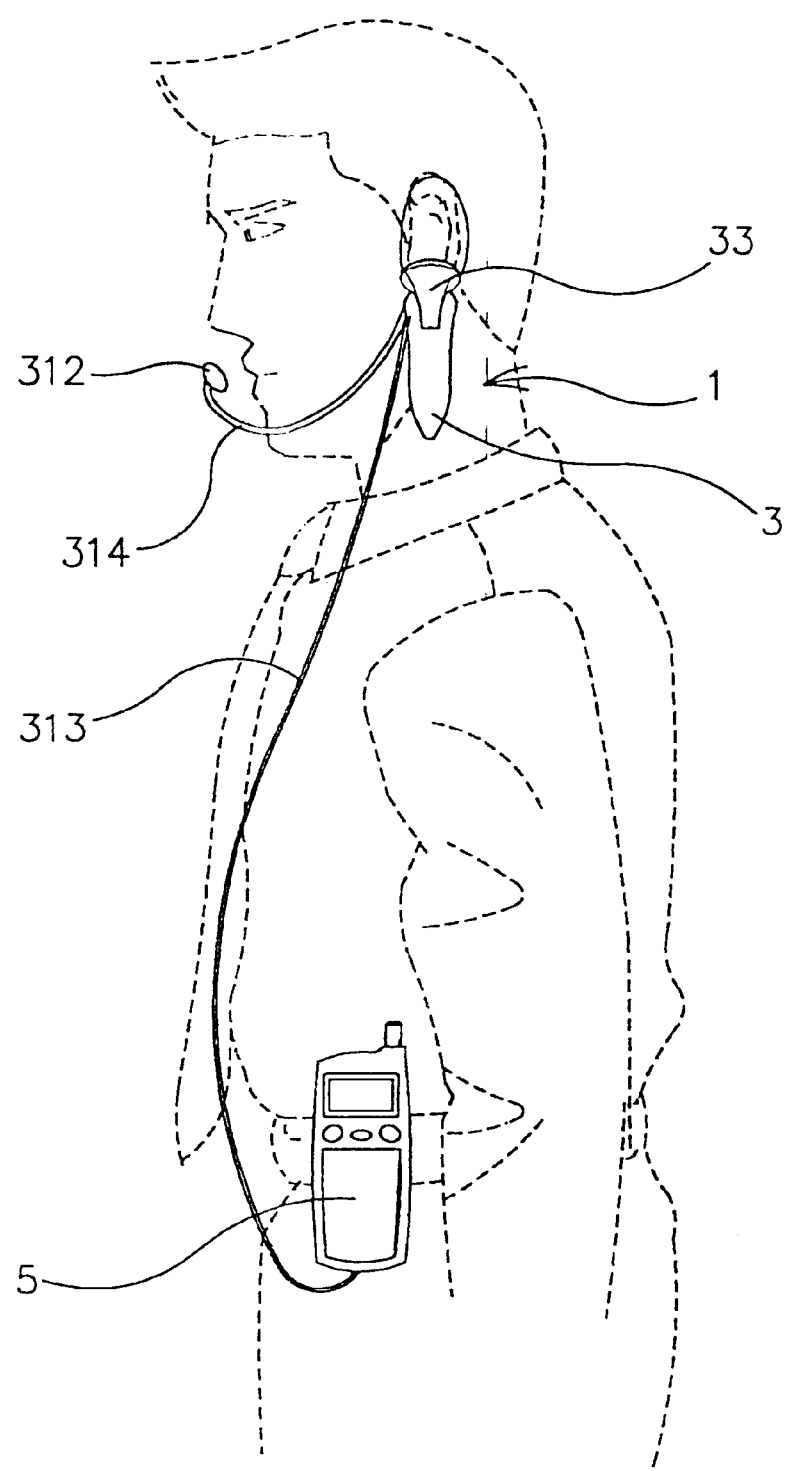
FIG. 5 is an applied example of the present invention.

As shown in FIG. 5, the clip 3 is disengaged from the holder 2, and the loud speaking structure 33 on the clip 3 is directly caught on the user's ear and then caught and fixed on a catching portion 302 through winding the power source wire 313 on the back edge of the user's ear, the plug 311 at another end is provided on a mobile telephone 5 which is directly caught on the user's body, and the microphone 312 is corresponding to the user's face through adjusting the hose 314 so that whenever the user is in a state of march, stop or driving a car to use the telephone, the purpose of being free of holding telephone can be achieved.

In view of the above, a multifunction device free of holding telephone according to the present invention is really practical and creative.

However, what is mentioned above is only a preferred embodiment of the present invention which cannot limit the scope of implementing the present invention, and all the equivalent changes and modifications in line with the claims of the present invention should remain in the scope of the claims of the present invention.

What is claimed is:

1. A multifunction device free of holding telephone, comprising:

a holder, which is a hollow cylinder with an open portion on the side edge for containing a battery and two corresponding through holes on the outer wall;

a connecting seat, which is a hollow, cylindrical and soft element with an upper end nested at the bottom of the holder and a terminal end connected to connected article of other functions; and a clip, which is two corresponding rousings with a top end formed as a groove to fix a loud speaking structure, a catching portion moulded integrally with the exterior of these housings, a PC board in these housings, a power source wire extended to the exterior thereof and ramified as microphone wire and plug wire, and a catching structure in the housings for joint on the holder; making use of the loud speaking structure directly caught in the user's ear, the plug wire winding on the back edge of his ear and catching on the catching portion so as to hang the clip on his ear, adjust the microphone position and achieve the function of being free of holding telephone.

2. A multifunction device free of holding telephone as claimed in claim 1, wherein the power source wire connected to the microphone is a flexible hose for adjusting and fixing the microphone position.

3. A multifunction device free of holding telephone as claimed in claim 1, wherein the connected article may be an ordinary pen, a laser pen or a flashlight.

4. A multifunction device free of holding telephone as claimed in claim 1 or 3, wherein the connector also may be a flexible hose directly connected to the bottom of connecting seat.

5. A multifunction device free of holding telephone as claimed in claim 4, wherein the holder and clip are supported and disposed on a plane through adjusting the angle of the hose.

6. A multifunction device free of holding telephone as claimed in claim 1, wherein the bottom of loud speaking structure is provided on the two inner sdie edges of the groove through a shaft rod.

7. A multifunction device free of holding telephone as claimed in claim 1 or 6, wherein the loud speaking structure can rotate in the groove for 180° approximately in respect of a shaft rod as a fulcrum.

8. A multifunction device free of holding telephone as claimed in claim 1, wherein the catching structure comprises a spring leaf provided between a set of corresponding L-shaped hook bodies, the salient and hook of the hook body protrude to the outer edge of housing of the clip, and the hook is caught in or disengaged from the hole on the holder through pressing the salient to force the spring leaf and to control the distance between the two hooks.

9. A multifunction device free of holding telephone as claimed in claim 1, wherein the catching portion may be L-shaped, annular or any shape for a wire to be disposed and caught therein.

* * * * *